United States Patent [19]
Johnson

[11] Patent Number: 6,116,552
[45] Date of Patent: Sep. 12, 2000

[54] REINFORCED PLASTIC TANK SUPPORT

[75] Inventor: Lee Alan Johnson, Coal Valley, Ill.

[73] Assignee: Deere Company, Moline, Ill.

[21] Appl. No.: 09/133,494

[22] Filed: Aug. 12, 1998

[51] Int. Cl.[7] .................................................. A47G 23/02
[52] U.S. Cl. .......................................................... 248/146
[58] Field of Search ........................ 280/414.1; 248/146, 248/154; 222/61, 175, 608

[56] References Cited

U.S. PATENT DOCUMENTS

| | | | |
|---|---|---|---|
| 2,332,991 | 10/1943 | Commire | 280/414.1 |
| 4,538,952 | 9/1985 | Chase | 280/414.1 |
| 4,541,549 | 9/1985 | Hadley et al. | 222/143 |
| 5,002,299 | 3/1991 | Firehammer et al. | 280/414.1 |
| 5,556,012 | 9/1996 | Ramey | 222/608 |

OTHER PUBLICATIONS

Brochure—Product Showcase, Flexicoil, pp. 1 and 2, date unknown.
Brochure—820 Tillage Unit, Flexicoil, 6 pages, date unknown but prior to Nov. 18, 1994.
Brochure—Air System 2400, concord, 2 pages, date unknown but prior to Sep. 30, 1993.
Brochure—Century Sprayers, Century, 4 pages, date unknown but prior to Sep. 29, 1993.
Brochure—7000 Series Air Seeder Tank, 4 pages, Morris Industries Ltd., dated Jun. 1994.

*Primary Examiner*—Andres Kashnikow
*Assistant Examiner*—Jorge Bocanegra

[57] ABSTRACT

A tank support for supporting a plastic product tank on a frame includes a plastic shell having a hollow interior and a base member nested in the hollow interior of the plastic shell. The base member is mounted to the frame, and a rod couples the base member to the plastic shell. By way of example, the plastic shell may be rotational molded in such a way that the plastic shell has a supporting surface which is complementary to a supported surface of the product tank.

20 Claims, 5 Drawing Sheets

REINFORCED PLASTIC TANK SUPPORT

BACKGROUND OF THE INVENTION

1. Field of the Invention

The present invention relates to agricultural product tanks, and more particularly to support structure for supporting a plastic product tank on an implement frame.

2. Description of Related Art

Air seeders, sprayers and other similar types of implements typically include product tanks for bulk storage of material to be distributed by the implement onto or underneath the soil. These tanks have been fabricated by welding and/or bolting sheet metal panels in a tank configuration on an implement frame. Sheet metal construction is relatively expensive, primarily because a relatively long fabrication time is required to assemble the panels on the support frame. In addition, these metal tanks are relatively heavy and subject to water leakage and corrosion, particularly in tanks which are used to contain fertilizer.

As an alternative to metallic fabrication, the more recent past has seen a progression toward manufacture of such tanks from composites or plastics. These plastic tanks do not corrode as a result of the products transported within the tanks, overcome most of the water leakage problems attendant metallic construction, are less expensive to make and weigh less than tanks made from steel.

One of the challenges in using a plastic product tank is developing a structure that effectively supports the tank without creating what is essentially a plastic-lined steel hopper. Known vehicles carrying plastic product tanks typically use steel to support the plastic tanks, which presents two main problems: excessive cost compared to using an all-steel tank, and wear and chaffing at the plastic/steel intersecting surfaces. An all steel support structure which substantially eliminates wear requires that there not be any flat steel edges riding directly against the plastic. Therefore, all corners, edges and ends which would contact the plastic would require rounded surfaces, representing a substantial increase in fabrication and/or assembly cost.

SUMMARY OF THE INVENTION

The tank support of the present invention includes a plastic shell which represents the portion of the support which makes contact with the plastic product tank. Nested in the plastic shell is a metal base member which is attached to the frame and provides the strength necessary to support the tank on the frame. A rod is inserted through the shell and base and ties the components of the support together so that relative movement is substantially eliminated and the load from the weight of the tank and its contents are efficiently transferred to the frame without substantial chaffing or wear of the tank or the tank support.

The tank supported by the tank support may be of various shapes and therefore, a single shape for a tank support may not be the most efficient for every tank. Conventional tanks are often rectangular in top view. The preferred embodiment for a tank support is designed to support a product tank with planar supported surfaces, such as a product tank which comprises tiers of eight slanted panels which circumscribe the tank. The tank support may be adapted to other tank shapes, but preferably the plastic shell conforms to the shape of the supported surface. The plastic tank support system of the present invention utilizes a rotational molded plastic shell which sits over a formed piece of sheet metal. The metal base member will absorb a large amount of the load by directly supporting the plastic shell. The remainder of the supported surface will require the plastic tank support to transfer the load to the sheet metal part. A metal rod is inserted in one end of the plastic tank support, through notches in the sheet metal part, and back out the other side of the plastic tank support. This rod helps support the outer wings of the plastic and also holds the plastic piece and the sheet metal piece together.

The plastic tank support of the present invention allows plastic-to-plastic contact where there is likely to be relative motion between the tank and the support, yet the support is reinforced by a simple sheet metal part that only contacts the plastic support with gently rounded edges. The plastic support also provides an aesthetically pleasing appearance. The plastic/steel assembly is more cost-effective than creating a steel-only support structure to properly support the tank. Also, under many circumstances, the support structure will enable use of recycled material for the tank supports which further improves its cost-effectiveness.

DESCRIPTION OF THE PREFERRED EMBODIMENT

Figure 1:
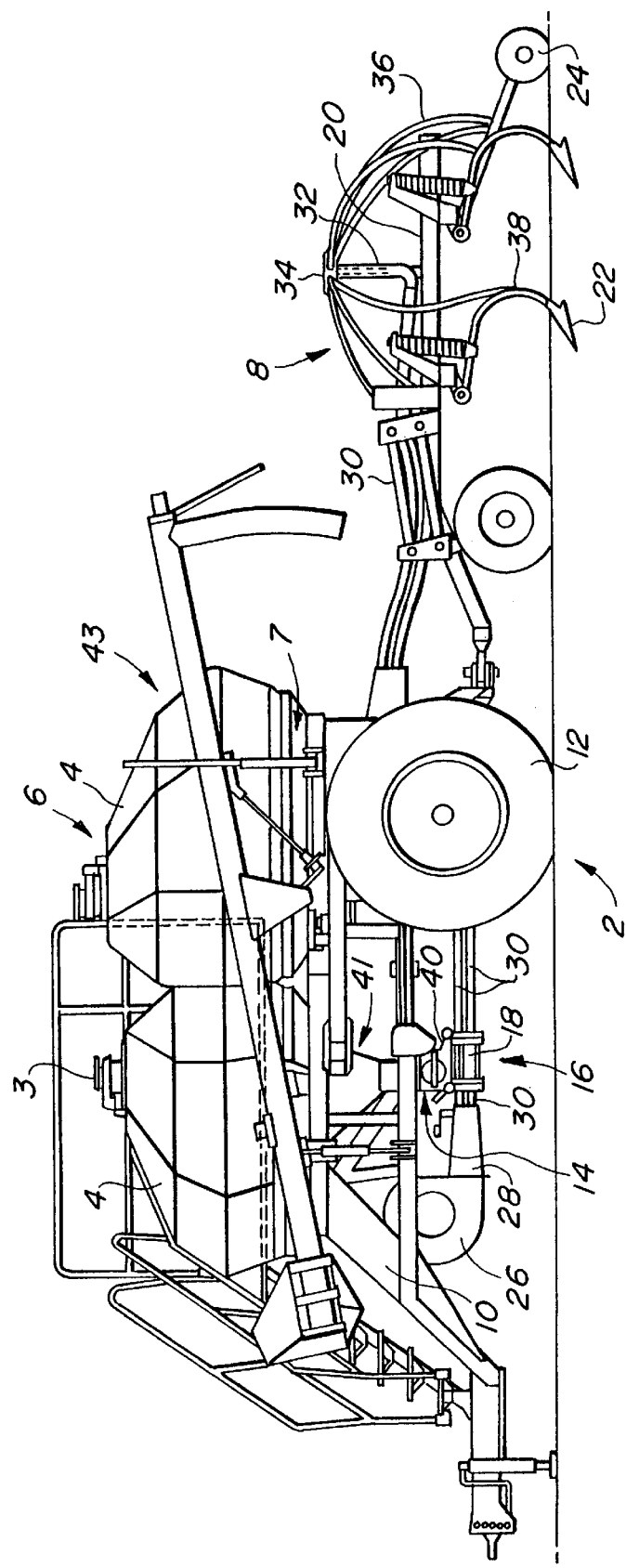
FIG. 1 is a left-side elevation of a commodity cart including two product tanks suported on a frame by tank supports constructed according to the present invention.

FIG. 1 shows an agricultural implement such as an air seeder 2 including two product tanks 4 constructed according to a preferred embodiment of the present invention. The air seeder 2 comprises a commodity cart 6 towed between a tractor (not shown) and a tilling implement 8. The commodity cart 6 has a frame 10 to which tank supports 7 and wheels 12 are mounted. The product tanks 4 are supported on the frame by the tank supports 7. Each product tank 4 has a door 3 releasably sealing an opening 5 (shown in FIGS. 2–3) at its upper end for filling the tank 4 with product, and an associated metering system 14 at its lower end for controlled feeding of product (in this case, granular material) into a pneumatic distribution system 16 at a primary distribution manifold 18. The tilling implement 8, towed behind the commodity cart 6, includes a frame 20 to which ground openers 22 and packers 24 are mounted.

The pneumatic distribution system 16 includes a centrifugal fan 26 which is connected to a plenum 28, which is in turn connected by distribution lines 30 to one or more primary distribution manifolds 18, each associated with a product tank 4. The primary distribution manifolds 8 are connected by distribution lines 30 to a dimpled riser tube 32, which is coupled to a secondary distribution header 34. Distribution lines 36 connect the secondary distribution header 34 to seed boots 38 mounted on the ground openers 22.

Each product tank 4 is pressurized by air from the centrifugal fan 26 conducted, for example, through a meter housing 40 and into the tank 4 by suitable conduit such as a hollow leg of a ladder (not shown). This results in substantially equal pressure above and below the product, allowing the product to enter the underlying air stream of the pneumatic distribution system 16. However, the product tank 20 must be sealed correctly during operation to assure accurate product delivery and to avoid "pulsing," an undesirable condition where product is delivered in disjointed batches rather than in a more continuous flow.

During operation of the air seeder 2, air and product flow in the pneumatic distribution system 16 from the primary distribution manifold 18 through distribution lines 30 to the dimpled riser tubes 32 which attempt to randomize distribution of product from the secondary distribution headers 34 which are immediately downstream. The secondary distribution headers 34 divide the product substantially evenly into a series of the distribution lines 36 leading to the seed boots 38 on the ground openers 22.

The product tank 4 is made up of a lower funnel portion 41 and an upper domed portion 43, each of which is made up of a plurality of planar surfaces forming side walls 11 of the product tank 4. The domed portion 43 has a product-carrying volume substantially greater than the volume of the funnel portion 41 for storing product under pressure. The funnel portion 41 is designed for efficient passage of product from the product tank 4 to the metering system 14 through a material outlet 45 at the lower end of the product tank 4.

The domed portion 43 of the product tank 4 has first, second, third and fourth tiers 80, 81, 82, 83 (shown in FIG. 3), each including a series of eight sidewalls 11 which circumscribe the dome portion 43. The fourth tier 83 has sidewalls 11 which extend in a direction having a horizontal component and which act as supported surfaces which rest on supporting surfaces 67 (FIG. 2) of the tank supports 7.

Figure 2:
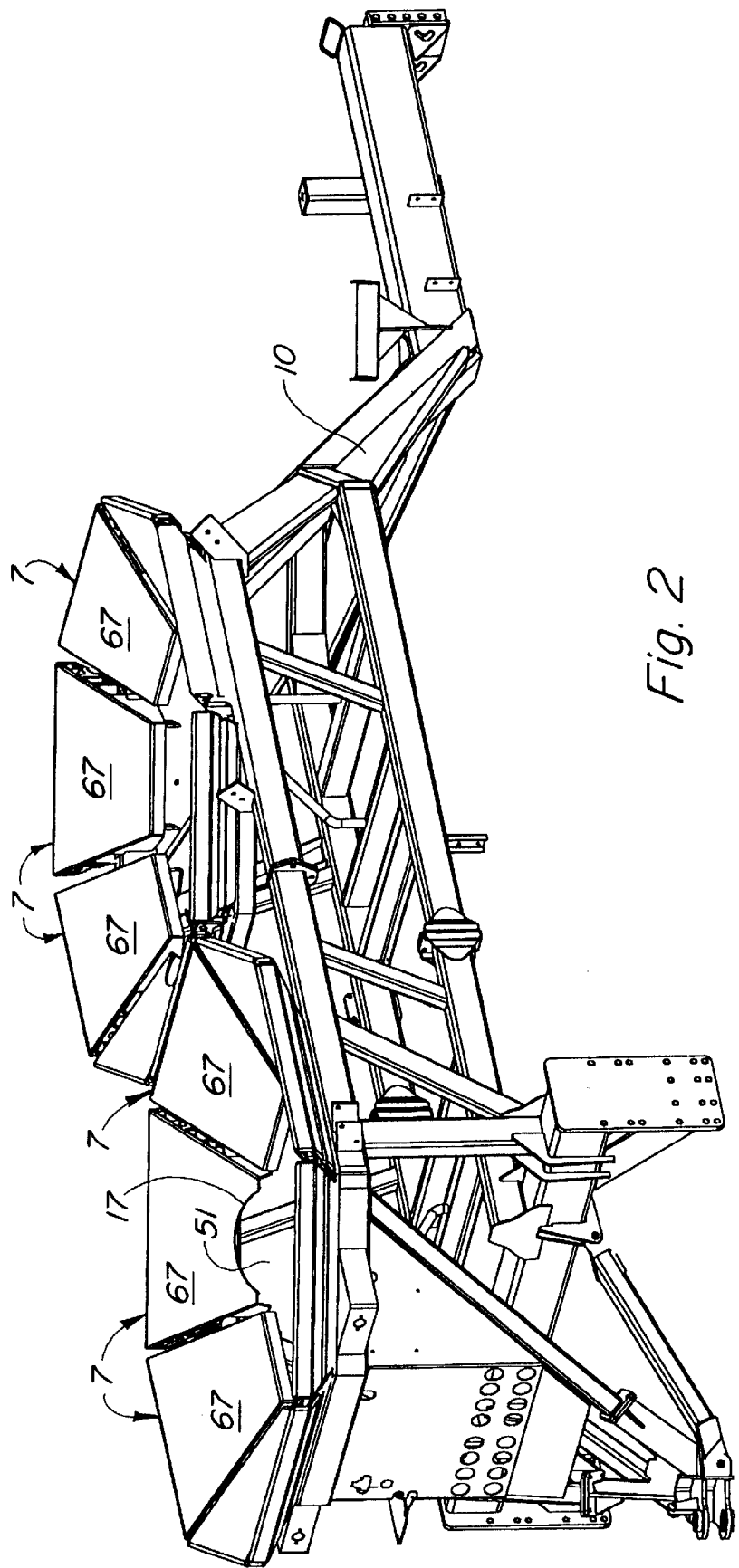
FIG. 2 is a perspective view of a frame of the commodity cart of FIG. 1 showing placement of the tank supports.

FIG. 2 shows a perspective view of the frame 10 wherein two sets of tank supports 7 are arranged, eight in each set, to support the two product tanks 4 shown in FIG. 1. The supports 7 are arranged around the frame 10, leaving a void 51 into which the funnel portion 41 of the product tank 4 extends when the tank 4 is placed on the supporting surfaces 67 of one of the sets of supports 7. Due to the shape of the product tank 4 shown in FIG. 1, a radius 17 is cut from an interior side of some of the supports 7 to accommodate the funnel portion 41 of the product tank 4.

Figure 3:
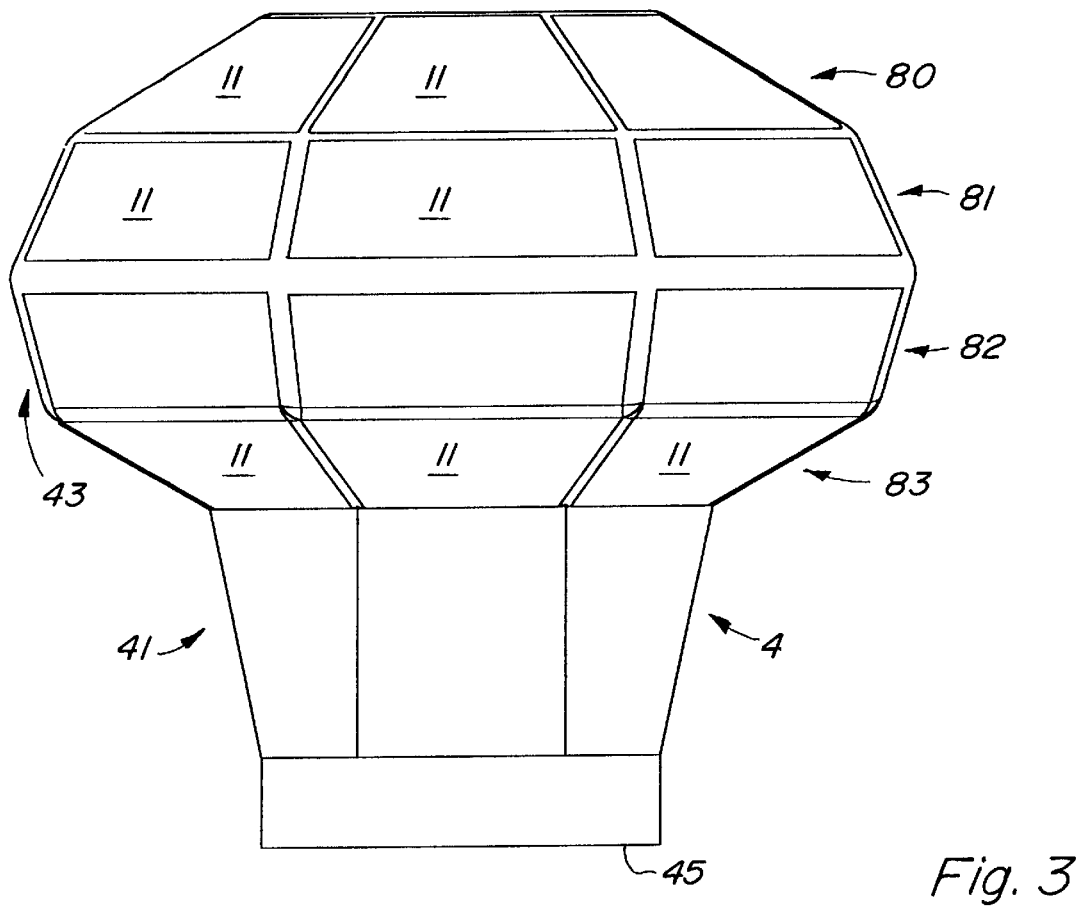
FIG. 3 is an exploded rear view of the frame of FIG. 2 and a product tank.
Figure 3:
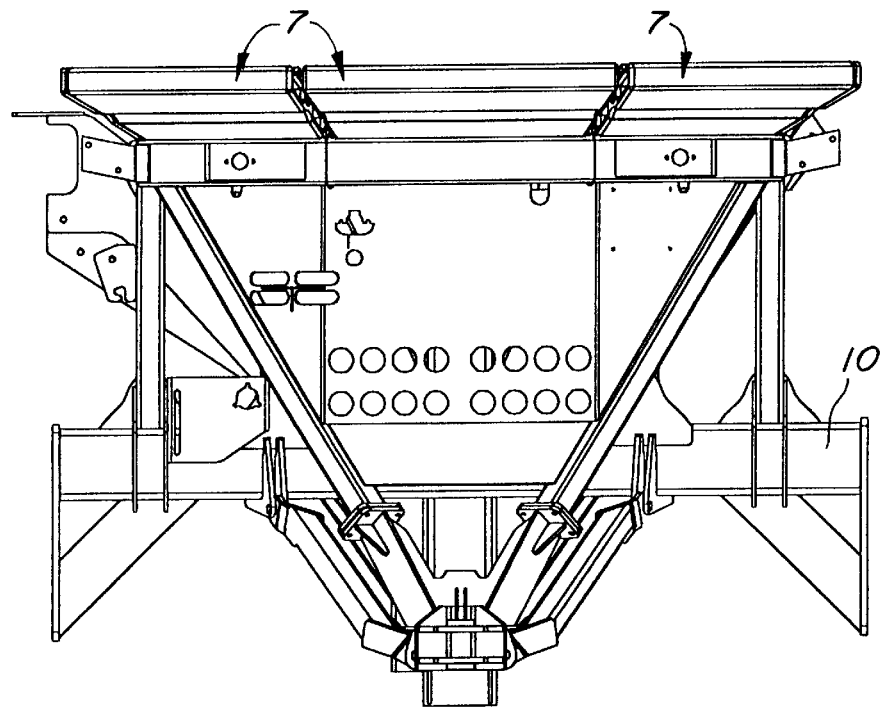

Referring now to FIG. 3, the frame 10 is shown from the rear with tank supports 7 mounted on the frame 10 so that they are ready to receive a product tank 4 shown above the frame 10. The tank supports 7 of the preferred embodiment are arranged so that they will engage the flat sidewalls 11 on the fourth tier 83 (the supported surfaces) of the product tank 4.

Figure 4:
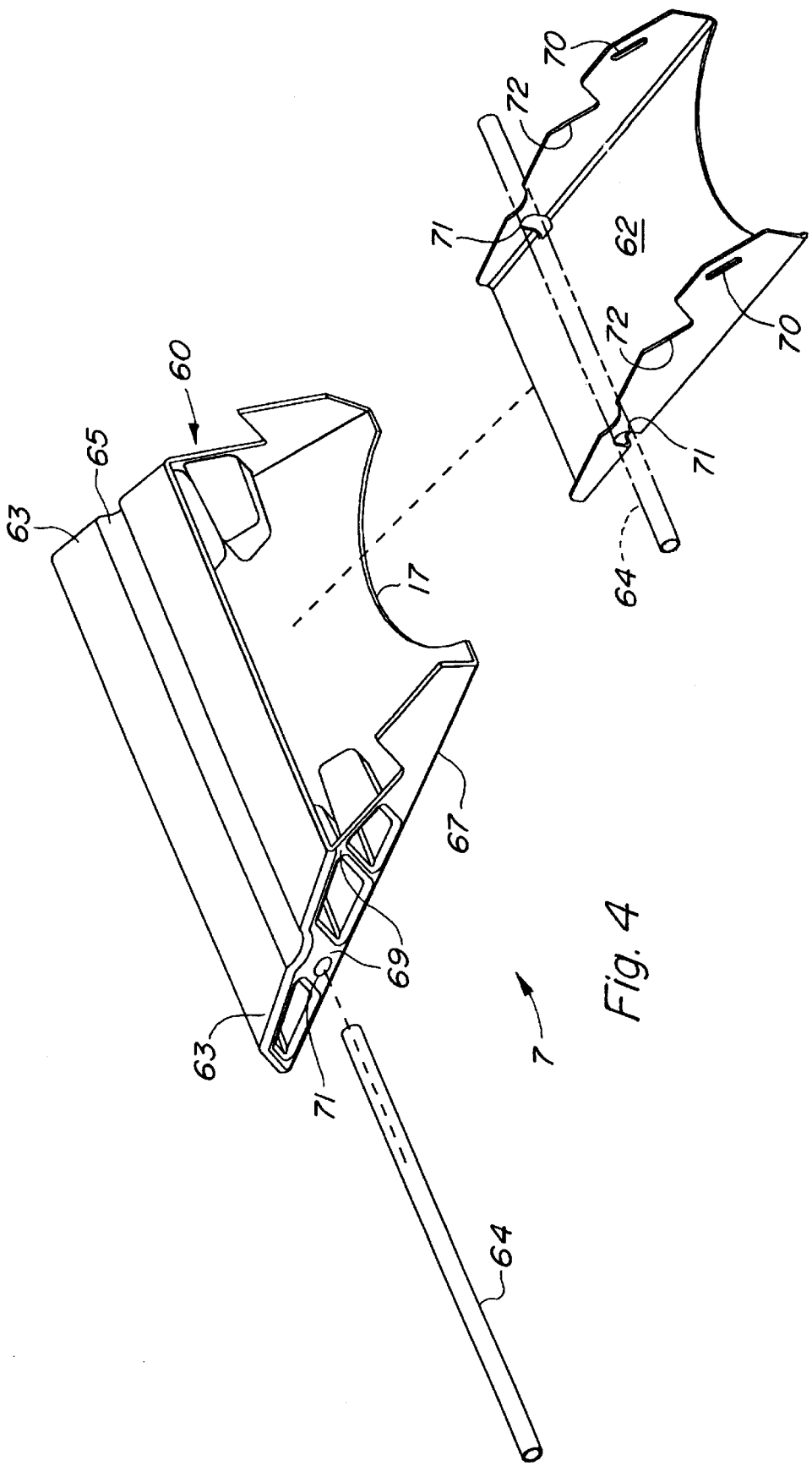
FIG. 4 is an exploded view of one of the tank supports of FIG. 1.

FIG. 4 shows the components of the tank support 7, including a plastic outer shell 60, U-shaped base member 62 and a rod 64. The shell 60 and the base member 62 are each provided with apertures 71 through which the rod 64 my be inserted. When slid into the apertures 71 so that it is in registration with the shell 60 and base member 62, the rod 64 aligns the shell 60 and base member 62 and provides additional support to the lateral extremes, or wings 63, of the shell 60 (which are not directly supported by the base member 62) so that force may be transferred from the shell 60 to the base member 62 and into the frame 10. Most preferably, the shell 60 is generally trapezoidal and formed with a groove 65 for stiffening the shell 60 across its width, as well as a series of vertical double-walled ribs 69 designed to increase structural rigidity.

Figure 5:
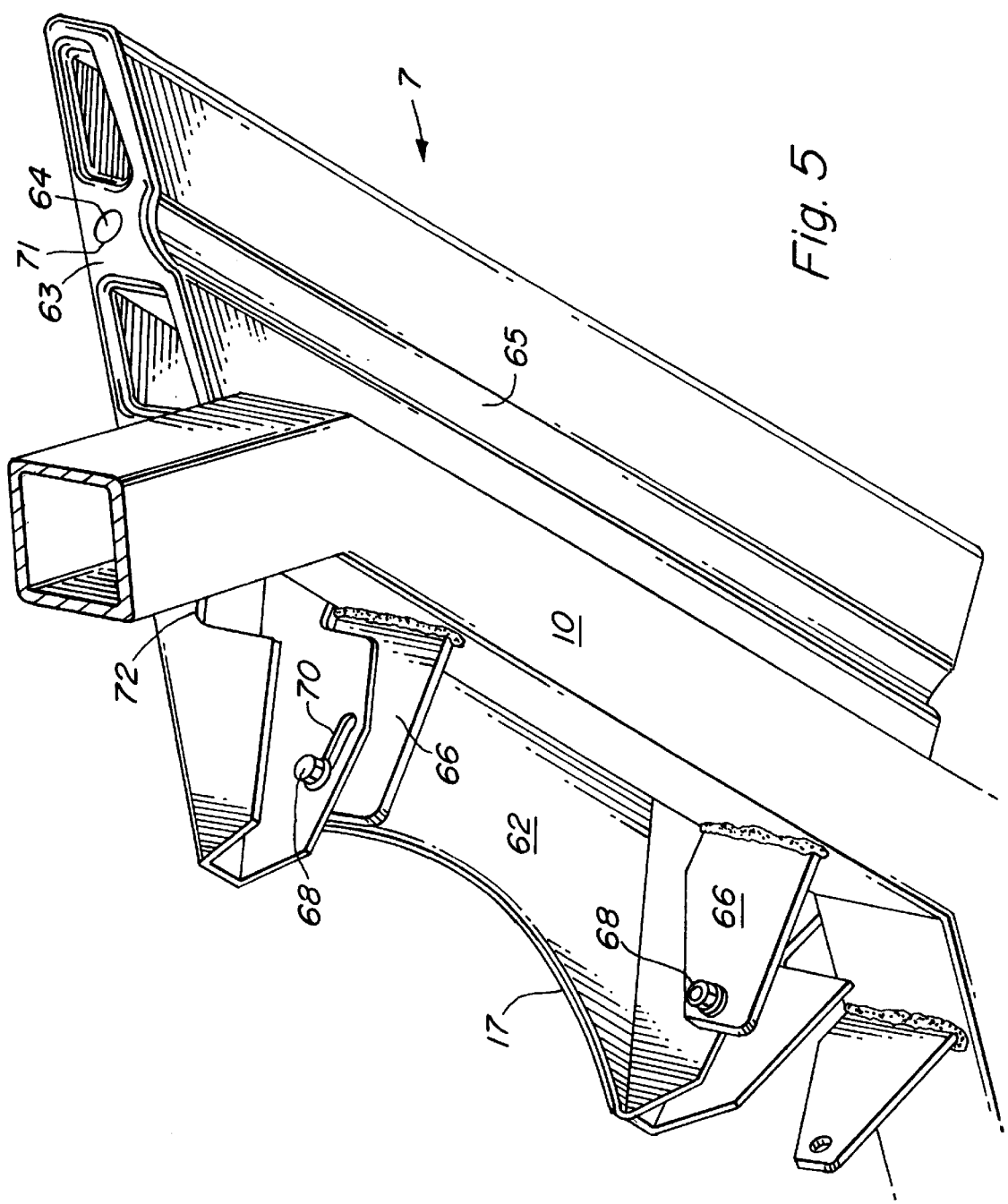
FIG. 5 is a worm's eye view of one of the tank supports of FIG. 1 as it is mounted on the frame according to a preferred embodiment of the present invention.

FIG. 5 shows the mounting structure of a preferred embodiment of the tank support 7 as seen from below. Mounting flanges 66 are welded to the frame 10 to form an integral part thereof. Although the base member 62 of the tank support 7 is shown mounted to the frame by bolts 68 extending through elongated bolt holes 70, it could be fixed to the frame by welding or alternate means known to those skilled in the art. When the tank support 7 of the preferred embodiment is assembled and mounted on the frame 10, a stepped portion 72 of the base member 62 rests on the frame 10. The supporting surface 67 of the plastic outer shell 60, which is located on the bottom of the tank support 7 as seen in FIG. 5, is configured and positioned to conform to the shape of a supported surface (one of the sidewalls 11 of the fourth tier 83) of the tank 4 (FIG. 1). The supporting surface 67 may be of various contours depending on the shape of the tank 4 used, but preferably the supporting surface 67 and the supported surface will be complementary so that the tank 4 and tank supports 7 interface effectively. A complementary relationship between the supporting and supported surfaces may be particularly beneficial where, as in the preferred embodiment, The tank 4 is held in place on tank supports 7 by gravity.

The present invention should not be limited by the above described embodiments, but should be limited solely by the claims that follow.

We claim:

1. A tank support for supporting a plastic product tank on a frame, said tank support comprising:
    a plastic shell having a hollow interior;
    a base member nested in the hollow interior of the plastic shelf and mounted to the frame; and
    a rod coupling the base member and the plastic shell to each other;
    said base member including a stepped portion which rests on top of the frame.

2. The tank support of claim 1 wherein the base member is bolted to the frame.

3. The tank support of claim 1 wherein the plastic shell is generally trapezoidal.

4. The tank support of claim 1 wherein the plastic shell includes a supporting surface, the tank includes a supported surface, and the shape of the supporting surface of the plastic shell is complementary to the shape of supported surface of the tank.

5. The tank support of claim 4 wherein the supported surface and the supporting surface are substantially planar.

6. The tank support of claim 1 wherein the plastic shell has a wing region which includes at least one vertical rib.

7. A commodity cart comprising:
    a frame;
    a plurality of wheels mounted to the frame;
    a plastic product tank having a supported surface;
    a meter coupled to the product tank; and
    a series of tank supports mounted to the frame and situated between the frame and the supported surface of the product tank;
    said tank support including a plastic shell having a supporting surface, a base member nested in the plastic shell and mounted to the frame, both the plastic shell and the base member coupled to one another by a rod.

8. The commodity cart of claim 7 wherein the base member is bolted to the frame.

9. The commodity cart of claim 8 wherein the base member includes a stepped portion which rests on top of the frame.

10. The commodity cart of claim 7 wherein the plastic shell is generally trapezoidal.

11. The commodity cart of claim 7 wherein the shape of the supporting surface is complementary to the shape of the supported surface.

12. The commodity cart of claim 11 wherein the supported surface and the supporting surface are substantially planar.

13. The commodity cart of claim 7 including eight tank supports arranged around the frame to form a void extending inwardly and downwardly from the frame.

14. The commodity cart of claim 13 wherein the tank has a funnel portion which extends into the void.

15. The commodity cart of claim 7 wherein two product tanks are supported on the frame by a plurality of tank supports.

16. A tank support for supporting a plastic product tank on a frame, said tank support comprising:

a generally trapezoidal plastic shell having a hollow interior;

a base member nested in the hollow interior of the plastic shell and mounted to the frame; and a rod coupling the base member and the plastic shell to each other.

17. The tank support of claim 16 wherein the base member is bolted to the frame.

18. The tank support of claim 16 wherein the plastic shell includes a supporting surface, the tank includes a supported surface, and the shape of the supporting surface of the plastic shell is complementary to the shape of supported surface of the tank.

19. The tank support of claim 18 wherein the supported surface and the supporting surface are substantially planar.

20. The tank support of claim 16 wherein the plastic shell has a wing region which includes at least one vertical rib.

* * * * *